US009328861B2

(12) United States Patent
Johnson et al.

(10) Patent No.: US 9,328,861 B2
(45) Date of Patent: May 3, 2016

(54) PORTABLE MODULAR MONOPOLE TOWER FOUNDATION

(71) Applicant: ARE Telecom Incorporated, St. Paul, MN (US)

(72) Inventors: Dion Johnson, St. Paul, MN (US); Michael Clifton, Flagstaff, AZ (US)

(73) Assignee: ARE Telecom Incorporated, Saint Paul, MN (US)

( * ) Notice: Subject to any disclaimer, the term of this patent is extended or adjusted under 35 U.S.C. 154(b) by 0 days.

(21) Appl. No.: 14/625,017

(22) Filed: Feb. 18, 2015

(65) Prior Publication Data

US 2015/0159802 A1    Jun. 11, 2015

Related U.S. Application Data

(63) Continuation of application No. 13/177,145, filed on Jul. 6, 2011, now Pat. No. 8,960,615.

(60) Provisional application No. 61/361,649, filed on Jul. 6, 2010.

(51) Int. Cl.
| | |
|---|---|
| *E04H 12/10* | (2006.01) |
| *F16M 11/22* | (2006.01) |
| *F03D 11/04* | (2006.01) |
| *F03D 1/00* | (2006.01) |
| *H01Q 1/12* | (2006.01) |
| *F24J 2/52* | (2006.01) |
| *E04H 12/22* | (2006.01) |

(52) U.S. Cl.
CPC ............ *F16M 11/22* (2013.01); *E04H 12/2238* (2013.01); *F03D 1/001* (2013.01); *F03D 11/04* (2013.01); *F03D 11/045* (2013.01); *F24J 2/523* (2013.01); *F24J 2/525* (2013.01); *F24J 2/526* (2013.01); *H01Q 1/1242* (2013.01); *F05B 2240/913* (2013.01); *F05B 2240/91521* (2013.01); *F16M 2200/08* (2013.01); *F24J 2002/5292* (2013.01)

(58) Field of Classification Search
CPC ... F16M 11/20; F16M 2200/08; F16M 11/22; H01Q 1/1242; H01Q 1/125; E04H 12/10; E04H 12/18; E04H 12/34; E04H 12/2238; F05B 2240/913; F05B 2240/61521; F24J 2/523; F24J 2/525; F24J 2/526; F24J 2002/5292; F03D 1/001; F03D 11/04; F03D 11/045
USPC ........... 343/879, 880; 248/188.7, 18.1, 163.1, 248/165, 431, 435, 440.1, 177.7, 180.1, 248/188, 528, 188.3, 188.4, 188.88
See application file for complete search history.

(56) References Cited

U.S. PATENT DOCUMENTS 2,474,250 A * 6/1949 Howard .......................... 52/114
3,028,595 A * 4/1962 Cole et al. ..................... 342/359

(Continued)

*Primary Examiner* — Nkeisha Smith
(74) *Attorney, Agent, or Firm* — Peter J. Ims; Westman, Champlin & Koehler, P.A.

(57) ABSTRACT

A modular foundation includes a central portion and at least three legs non-rotatably secured to and extending from the central portion. The at least three legs are substantially equally spaced apart from each other wherein each leg includes a proximal end and a distal end. A basket is attached to the distal end of each leg wherein the basket is configured to be secured in a selected position. A platform is pivotally attached to the central portion wherein the platform is configured to move from a vertical position to a horizontal position.

17 Claims, 4 Drawing Sheets

(56) References Cited

U.S. PATENT DOCUMENTS

| | | |
|---|---|---|
| 3,937,434 A | 2/1976 | Tacke |
| 4,317,552 A * | 3/1982 | Weidler .................. 248/168 |
| 4,799,642 A | 1/1989 | Wright |
| 4,898,353 A * | 2/1990 | Jih et al. .................. 248/188.7 |
| 4,923,319 A | 5/1990 | Dent |
| 5,236,167 A | 8/1993 | Tai |
| 5,290,004 A | 3/1994 | Frost |
| 5,363,116 A | 11/1994 | Allen |
| D362,854 S | 10/1995 | Fahy |
| 5,531,419 A | 7/1996 | Gustafsson et al. |
| 5,899,422 A | 5/1999 | Eke |
| RE36,640 E | 4/2000 | Frost et al. |
| 6,229,497 B1 | 5/2001 | McCracken |
| 6,572,061 B2 | 6/2003 | Overbeck |
| 6,630,912 B2 | 10/2003 | Ehrenberg et al. |
| 6,711,993 B2 * | 3/2004 | Robertson .................. 99/448 |
| 6,868,641 B2 | 3/2005 | Conner et al. |
| 7,077,369 B2 | 7/2006 | Hardin |
| 7,246,782 B2 | 7/2007 | Crookham et al. |
| 7,984,789 B2 * | 7/2011 | Michalec .................. 182/115 |
| 2012/0228442 A1 | 9/2012 | Clifton |

* cited by examiner

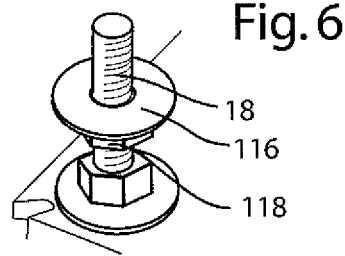
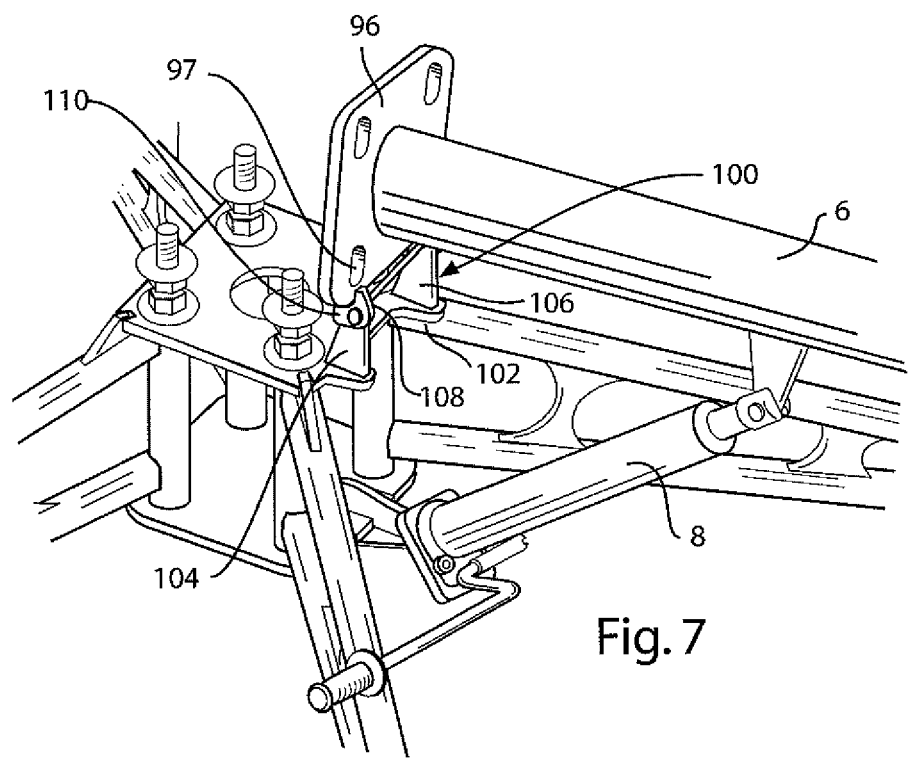

PORTABLE MODULAR MONOPOLE TOWER FOUNDATION

CROSS REFERENCE TO RELATED APPLICATION

This application claims the benefit of U.S. Provisional Application Ser. No. 61/361,649, which was filed on Jul. 6, 2010, the contents of which are incorporated by reference its entirety.

FIELD OF THE INVENTION

The present invention relates to a foundation and raising system for a monopole tower. More particularly, the present invention relates to a portable, modular monopole foundation and raising system for a monopole tower that can support one of a number of pieces of equipment including wind turbines, solar panels, street lights, communication devices, monitoring systems where the system can be stored and transported in a disassembled state and assembled on site and stabilized with weights, ballast or anchors or a combination thereof.

BACKGROUND OF THE INVENTION

Monopoles towers are becoming increasingly utilized in numerous industries including, for instance, renewable wind energy and solar energy. Monopole towers are also utilized in the satellite and wireless communication industries. Monopole towers provide the necessary structural support to maintain equipment in an elevated position. Typical equipment supported by monopole towers include wind turbines, typically 100 kW and smaller, solar panels or antennae. Monopole towers also require less capital expenditure when compared to a typical support structure. Monopole towers can also be utilized to support meteorological equipment such as an anemometer, wind direction vanes, temperature sensors and pressure sensors. Monopole towers can also be utilized to support streetlights or any other industry where an elevated lighting source is required, such as the construction industry.

Typically, monopole towers are secured to concrete foundations having footings buried into the ground. Concrete foundations are typically expensive to construct and often times require a construction permit. Once constructed, the foundation cannot be moved. Therefore, if a location for a monopole tower location is abandoned or becomes obsolete, the foundation either is removed at a substantial cost or abandoned in the location, becoming a potential hazard.

Many monopole tower constructions do not provide for a device to lower the monopole tower to access or protect the elevated equipment. For instance, if a wind turbine secured to a top of a monopole tower were left raised in an elevated position during a storm having high wind loads, either the wind turbine or the monopole tower or both could be damaged. The present disclosure includes a modular portable foundation and raising device to conveniently raise and lower the monopole tower and the attached equipment.

SUMMARY OF THE INVENTION

A first aspect of the present disclosure includes a modular foundation having a central portion and at least three legs non-rotatably secured to and extending from the central portion. The at least three legs are substantially equally spaced apart from each other wherein each leg includes a proximal end and a distal end. A basket is attached to the distal end of each leg wherein the basket is configured to be secured in a selected position. A platform is pivotally attached to the central portion wherein the platform is configured to move from a vertical position to a horizontal position.

A second aspect of the present disclosure includes a device configured to retain equipment in an elevated position. The device includes a modular foundation having a central portion and at least three legs non-rotatably secured to and extending from the central portion. The at least three legs are substantially equally spaced apart from each other wherein each leg includes a proximal end and a distal end. A basket is attached to the distal end of each leg wherein the basket is configured to be secured in a selected position. A platform is pivotally attached to the central portion wherein the platform is configured to move from a vertical position to a horizontal position. A monopole tower is attached to the platform such that as the platform is rotated from the vertical position to the horizontal position the monopole tower is raised from a horizontal or lowered position to a substantially vertical or raised position where a distal end of the monopole tower is configured to retain the selected piece of equipment.

BRIEF DESCRIPTION OF THE DRAWINGS

FIG. 6 is a perspective view of a leveling device on the foundation.

FIG. 7 is a partial perspective view of a jack attached to the foundation for raising and lowering the monopole tower.

DETAILED DESCRIPTION

Figure 1:
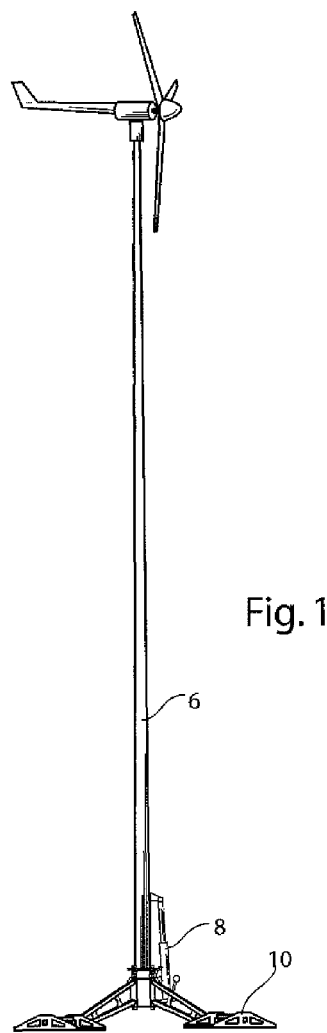
FIG. 1 is a perspective view of the foundation and the monopole tower in raised configuration.
Figure 2:
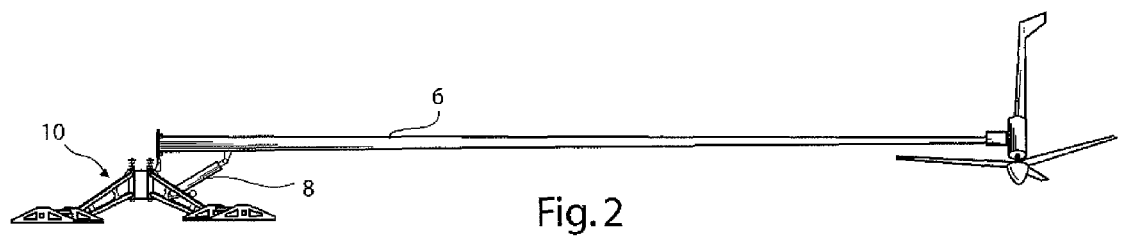
FIG. 2 is a perspective view of the foundation and a monopole tower in a lowered configuration.

A portable and modular foundation for supporting, elevating and lowering a monopole tower 6 is generally illustrated in FIG. 1 at 10. The monopole tower 6 is pivotally attached to the foundation 10 and is raised and lowered with a jack 8 as illustrated in FIGS. 1 and 2, respectively. However, other raising and lowering mechanisms are also contemplated.

Figure 3:
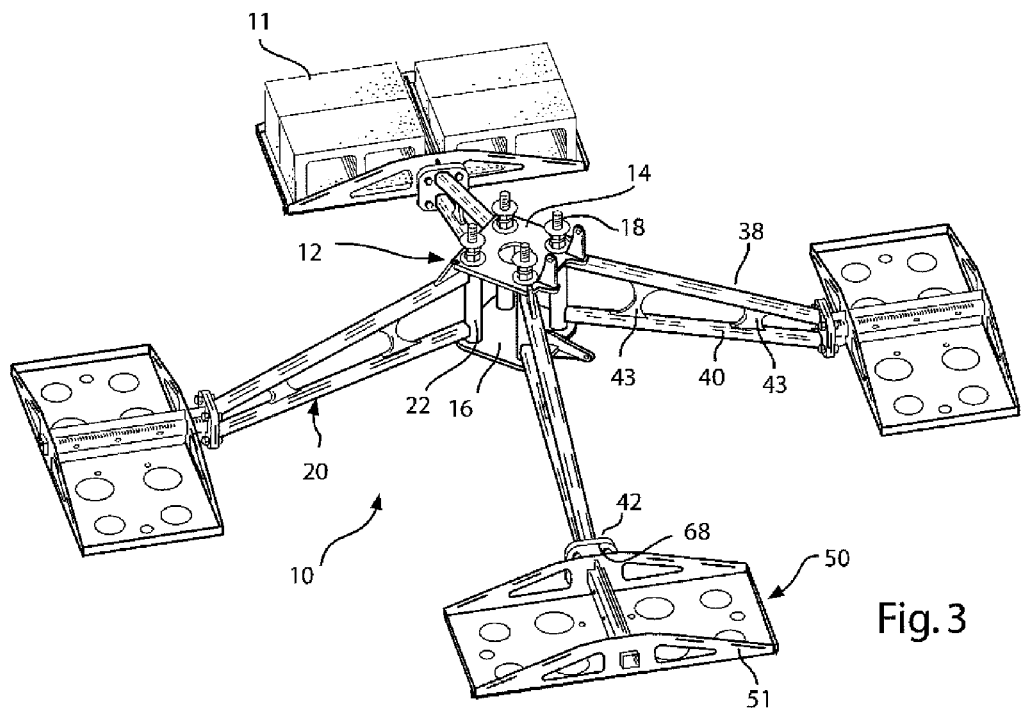
FIG. 3 is a perspective view of a portable and modular monopole foundation.

Referring to FIG. 3, the foundation 10 is modular in design wherein the foundation 10 can be transported in a compact, disassembled state. The design of the foundation 10 also allows the components to be assembled with standard wrenches. The design of the modular foundation 10 therefore allows for compact for travel and storage, and also allows the foundation 10 to be easily assembled in a short amount of time. The foundation 10 provides increased convenience and accessibility to the use of monopole towers in remote locations and in diverse terrain.

The foundation 10 includes a central portion 12 having an upper plate 14 and a lower plate 16 that are spaced apart by proximal ends 22 of legs 10. Four legs 20 are typically utilized and are evenly spaced apart around the central portion 12. While four or more legs 20 are typical, three or more legs 20 are contemplated.

Figure 4:
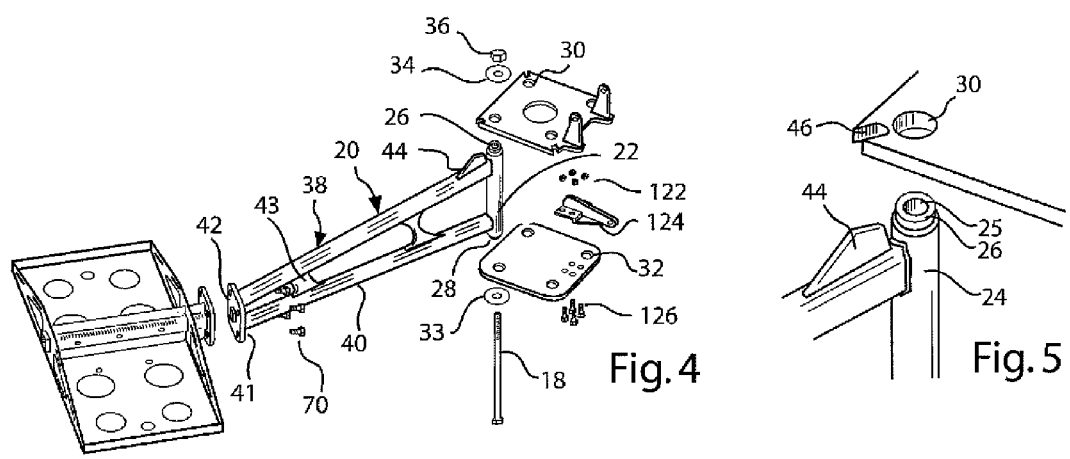
FIG. 4 is a partial exploded view of a leg of the foundation and a central portion of the foundation.
Figure 5:
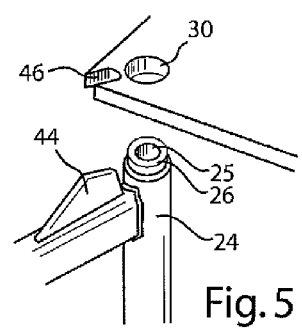
FIG. 5 is an exploded view of a portion of a leg and a top plate of the base of the foundation.
Figure 8:
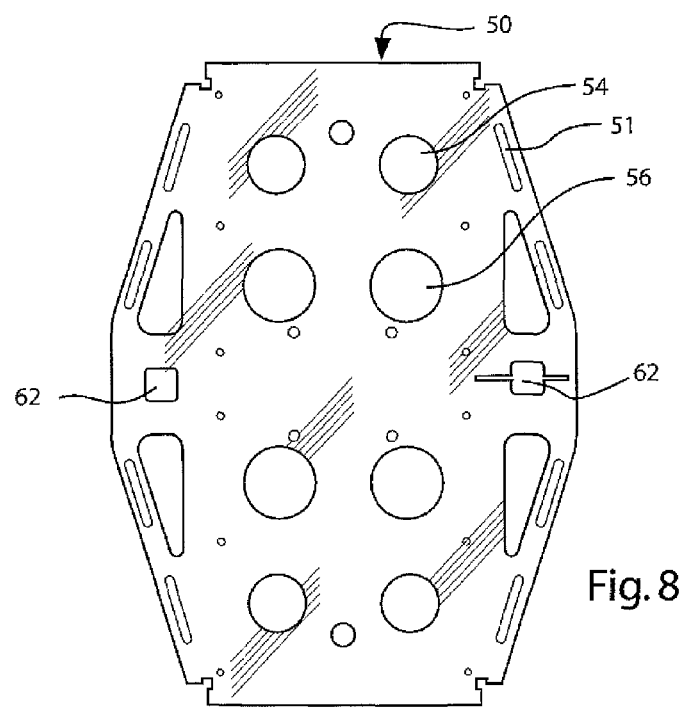
FIG. 8 is a top view of a sheet that is formed into a basket.
Figure 9:
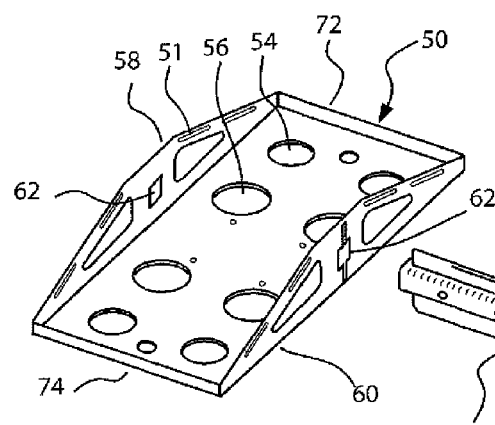
FIG. 9 is an exploded perspective view of the basket and an attaching device.

Referring to FIGS. 3 and 4, each arm 20, which are similarly constructed, includes a tubular portion 24 at the proximal end 22 having upper and lower bosses 26 and 28 that secure within an upper aperture 30 in the upper plate 14 and a lower aperture 32 in the lower plate 16, respectively. A bolt 18 is positioned through a through bore 25 in the tubular portion 24 where the bolt 18 extends through the top edge of the upper boss 26. A washer 33 typically separates the head of the bolt 18 from a bottom surface of the lower plate 14. A flat washer 34 and a nut 36 secure the bosses 26 and 28 within the apertures 30 and 32, respectively. Utilizing bosses 26 and 28 provides for positive locking of the tubular portion 24 to the plates 14 and 16 while preventing bolt sheer.

The leg 20 includes an upper bar 38 and a lower bar 40 that are attached to the tubular portion 24 proximate the upper and lower bosses 26 and 28, respectively. The upper bar 38 and the lower bar 40 attach to a mounting plate 42 at a distal end 41 where the distance between the upper bar 28 and the lower bar 40 gradually converges such that the upper bar 38 is at a steeper angle than the lower bar 40. The upper and lower bars 38 and 40 are reinforced by intermediate bracing plates 43 which prevent the bars 38 and 40 from bending or bowing when supporting the monopole 8 and a piece of equipment.

A tab 44 extending from the upper bar 38 is positioned within a slot 46 in the upper plate 14 where the engagement of the tab 44 with the slot 46 prevents rotation of the leg 20 about the bolt 18 and therefore retains the leg 20 in a fixed position relative to the central portion 12. The slots 46 are typically located ninety degrees apart from each other on the upper plate 14 for a four leg foundation 10. However, the location of the slots 46 and apertures 30 and 32 will vary depending on the number of legs 20 utilized in the foundation 10.

Referring to FIGS. 3 and 8-10, a basket 50 is attached to the distal end 41 of each leg 20. The basket 50 is typically constructed from a sheet of metal that is stamped and bent to form the desired configuration of the basket 50. However, the basket 50 could also be formed by attaching desired portions to each other, such as but not limited to, with a weld.

The basket 50 includes a bottom wall 52 having apertures 54, 56 where the apertures 54 and 56 are of different diameters. Left and right side walls 58 and 60 extend upwardly from the bottom wall 52 where the left and right sidewalls 58, 60 have aligned openings 62 that accept a mounting bar 64. The mounting bar 64 has flat surfaces that engage flat surfaces on the aligned opening to prevent the mounting bar 64 from rotating with respect to the basket 50. A proximal end 66 of the mounting bar 64 has a mounting bracket 68 that is attached to the mounting bracket 42 at the distal end 41 of the leg 20. A threaded engagement utilizing bolts 70 are typically utilized to secure the mounting brackets 68 and 23 together such that the basket 50 is non-rotatably and removably attached to the leg 20.

The basket 50 includes front and back walls 72 and 74 that extend upwardly from the bottom wall 52. The basket 50 allows for numerous ways for securing the foundation 10 in a selected position.

Ground anchors can be forced into the ground through the apertures 52. The ground anchors are screwed into the ground and engage the bottom wall 52 to retain the baskets 50 in place. Pipes can also be forced into the ground through the apertures 54 where the pipes aid in retaining the brackets 50 in a selected position.

Ballast such as batteries, that are utilized to provide electricity to a remote site, rocks, soil, or concrete blocks 11 as illustrated in FIG. 3 can be placed into the basket 50 where the weight of the ballast retains the foundation 10 in the selected position and resists the monopole 6 and the attached equipment from toppling, such as due to wind loading. If more than one course of concrete blocks 11 are necessary to provide the required ballast, straps may be positioned over the courses of blocks and secured to slots 51 in the side walls 58 and 60.

Figure 10:
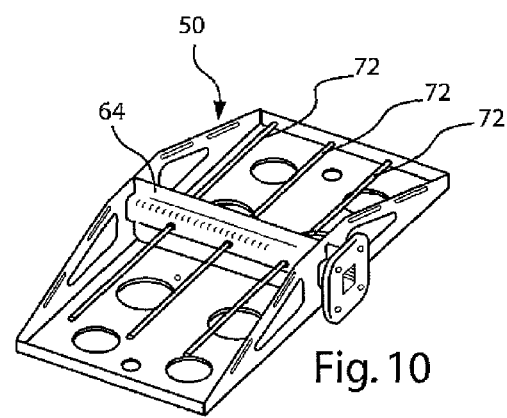
FIG. 10 is a perspective view of the basket with re-bar rods inserted through the attaching device.

Referring to FIG. 10, re-bar 80 can optionally be inserted through apertures in the mounting bar 64 that extend substantially from the front wall 72 to the back wall 72 to provide strength and stability to concrete poured into the basket 50. However, the re-bar 80 is optional when utilizing concrete or other types of ballast.

The foundation 10 can also be positioned into a hole in the ground and covered in concrete which would provide a permanent placement of the foundation 10. However, when the baskets 50 are secured in a selected location below grade, sufficient clearance must be provided for the operation of the jack 8 that is utilized to raise and lower the monopole tower 6.

The jack 8 attaches to a bottom mounting bracket 124 extending from the lower plate 16 and a mounting bracket 94 attached to the monopole tower 6 as best illustrated in FIGS. 4 and 7. A mechanical screw type jack 8 is illustrated. However, any jack capable of raising and lowering the monopole tower 6 and the attached equipment can be utilized. The mounting bracket 124 is attached to the lower plate 32 with a threaded engagement of bolts 126 and nuts 124.

To raise the monopole tower 6, a plate 96 attached to the bottom end of the monopole tower 6, is secured to a mounting bracket 100 attached to the upper plate 16. The mounting bracket 100 includes a lower portion 102 having two spaced apart lower members 104 and 106 having aligned through bores proximate an upper end. An upper portion 108 having spaced apart upper members 110 and 112 are fixedly attached to the plate 96. A pivot pin 114 is secured through the aligned apertures to pivotally attach the lower and upper portions 102 and 108, respectively such that the monopole tower 6 can be pivotally raised and lowered relative to the foundation 10, as illustrated in FIGS. 1 and 2.

With the monopole tower 6 in a lowered position as illustrated in FIG. 2, the jack 8 is manipulated to extend the length of the jack 6, which causes the monopole tower 6 to be pivotally raised. As the monopole tower 6 reaches a substantially vertical position, four elongated slots 97 in the plate 96 are positioned about the bolts 18 until the plate 96 rests on washers 116 positioned on leveling nuts 118. As the plate 96 moves in an arcuate motion, the elongate slots 97 provide the necessary clearance to accept the bolts 18 through the arcuate movement.

Once the plate 96 is positioned on the washers 116, the leveling nuts 118 are manipulated to cause the plate 96 adjusted to be substantially horizontal resulting in the monopole tower 6 to be substantially vertical as illustrated in FIG. 1, which minimizes any moment force on the monopole tower 6. A nut threadably engage the bolt 18 until a sufficient frictional engagement between the plate 96 and the washers 110 is created such that the monopole tower 6 is secured in the selected vertical position.

To lower the monopole tower 6, the top nuts and washers are removed from the bolts 18. The jack 8 is then manipulated to shorten the length and thereby pivotally lower the monopole tower 6.

The foundation 10 provides a compact modular design that can be easily transported and constructed on site. The foundation 10 has numerous securing features which allow the foundation 10 to be secured in several ways such that the foundation 10 can be utilized on almost any surface or terrain. Finally, the foundation 10 is safe, efficient and easily constructed piece of equipment that can be utilized for raising and lowering the monopole tower 6 without the need of additional equipment or more than one person.

Although the present invention has been described with reference to preferred embodiments, workers skilled in the art will recognize that changes may be made in form and detail without departing from the spirit and scope of the invention.

The invention claimed is:

1. A modular foundation comprising:
   a central portion comprising:
   a bottom plate having at least three spaced apart apertures;
   a top plate having at least three spaced apart apertures that are configured to align with the three spaced apart apertures in the bottom plate; and
   at least three tubular portions, each tubular portion having a first end and second end and a through bore extending from the first end to the second end and wherein each of the tubular portions is configured to align with one of the spaced apart apertures in each of the bottom plate and the top plate;
   at least three threaded bolts, each of the bolts configured to be positioned through one of the apertures in the top plate, the through bore in one of the tubular portions and one of the apertures in the bottom plate;
   at least three nuts, each of the nuts configured to engage the threaded bolts to frictionally secure the bottom plate and top plate to one of the tubular portions; and
   a mounting plate pivotally attached to the top plate and configured to move from a substantially horizontal position to a substantially vertical position, wherein when in the horizontal position a plurality of apertures in the mounting plate are positioned about the at least three threaded bolts such that the mounting plate can be leveled.

2. The modular foundation of claim 1, and wherein each of the at least three tubular portions comprises:
   a first boss proximate the first end, the first boss configured to be positioned within one of the apertures in the top plate; and
   a second boss proximate the second end, and configured to be positioned within one of the apertures in the bottom top plate.

3. The modular foundation of claim 1 and further comprising at least three spaced apart legs, each of the legs having a proximal end attached to one of the tubular portions and wherein each of the legs comprises a distal end.

4. The modular foundation of claim 3 and wherein each of the three spaced apart legs comprises a top member and a bottom member wherein a distance between the bottom member and the top member is greater proximate the proximal end relative to the distal end.

5. The modular foundation of claim 4 and wherein the top plate further comprises at least three spaced apart slots.

6. The modular foundation of claim 5 and wherein the top member of each leg further comprises a tab wherein the tab is configured to be positioned within one of the spaced apart slots in the top plate, wherein when the tab is positioned within the slot rotational movement of the leg relative to the central portion is prevented.

7. The modular foundation of claim 1 and further comprising a lifting mechanism mounting bracket configured to be attached to the bottom plate and configured to engage one end of a lifting mechanism.

8. The modular foundation of claim 1 and further comprising a leveling mechanism positionable between the top plate and the mounting plate wherein the leveling mechanism is configured to be manipulated to position the mounting plate in a substantially horizontal position.

9. The modular foundation of claim 8 and wherein the leveling mechanism comprises at least three leveling nuts, each leveling nut configured to threadably engage one of the bolts and to engage a bottom surface of the mounting plate such that movement of the leveling nuts causes the mounting plate to move relative to the central portion.

10. A modular foundation comprising:
    a central portion comprising:
    a bottom plate having a plurality of spaced apart apertures;
    a top plate having a plurality of spaced apart apertures that are configured to align with the plurality of spaced apart apertures in the bottom plate;
    a plurality of spacers, each spacer having a first end and second end and a passage extending from the first end to the second end and wherein each of the plurality of spacers is configured to align with one of the plurality of spaced apart apertures in each of the bottom plate and the top plate, each spacer having a first end boss and a second end boss, the first end boss and the second end boss configured to secure the spacer within a top plate aperture of the plurality of top plate apertures and a bottom plate aperture of the plurality of bottom plate apertures; and
    a plurality of connecting members, each connecting member configured to be positioned through an aperture of the plurality of apertures in the top plate, a passage in one of the plurality of spacers and an aperture of the plurality of apertures in the bottom plate, each of the plurality of connecting members being configured to secure the top plate to the bottom plate through a frictional engagement with the spacer, wherein each of the plurality of connecting members comprises:
    a threaded bolt having a length such that a threaded end extends beyond the top plate; and
    a nut configured to threadably engage the threaded end and to cause a frictional engagement of the top plate and the bottom plate with the connecting member;
    and further comprising a mounting plate pivotally attached to the top plate, the mounting plate having a plurality of apertures therein, each aperture of the plurality of apertures in the mounting plate configured to accept the threaded end of a respective threaded bolt.

11. The modular foundation of claim 10 and further comprising a leveling mechanism positioned between the top plate and the mounting plate wherein the leveling mechanism is configured to manipulate a position of the mounting plate when the mounting plate is positioned about the threaded ends of the plurality of bolts.

12. The modular foundation of claim 11 and wherein the leveling mechanism comprises a plurality of leveling nuts, each leveling nut configured to threadably engage one of the plurality of threaded bolts wherein movement of the leveling nut about the bolt causes a position of the mounting plate to move when positioned about the threaded ends of the plurality of bolts.

13. The modular foundation of claim 10 and further comprising a plurality of legs, each of the plurality of legs extend from one of the plurality of spacers and away from the central portion.

14. The modular foundation of claim 13 and wherein the top plate further comprises a plurality of spaced apart slots and each leg of the plurality of legs comprises a tab wherein the tab on each leg is configured to be positioned within one of the spaced apart slots in the top plate, wherein when the tab is positioned within the slot rotational movement of the leg relative to the central portion is prevented.

15. The modular foundation of claim 13 and further comprising a plurality of baskets, each basket configured to be attached to a distal end of one leg of the plurality of legs, each basket configured to retain ballast.

16. The modular foundation of claim 10 and further comprising a monopole having a first end secured to the mounting plate and a second end configured to retain a piece of equipment thereon.

17. The modular foundation of claim 16 and further comprising a lifting mechanism configured to raise and lower the monopole, the lifting mechanism having a first end configured to be secured to the central portion and a second end configured to be secured to the monopole.

* * * * *